Figure 1:
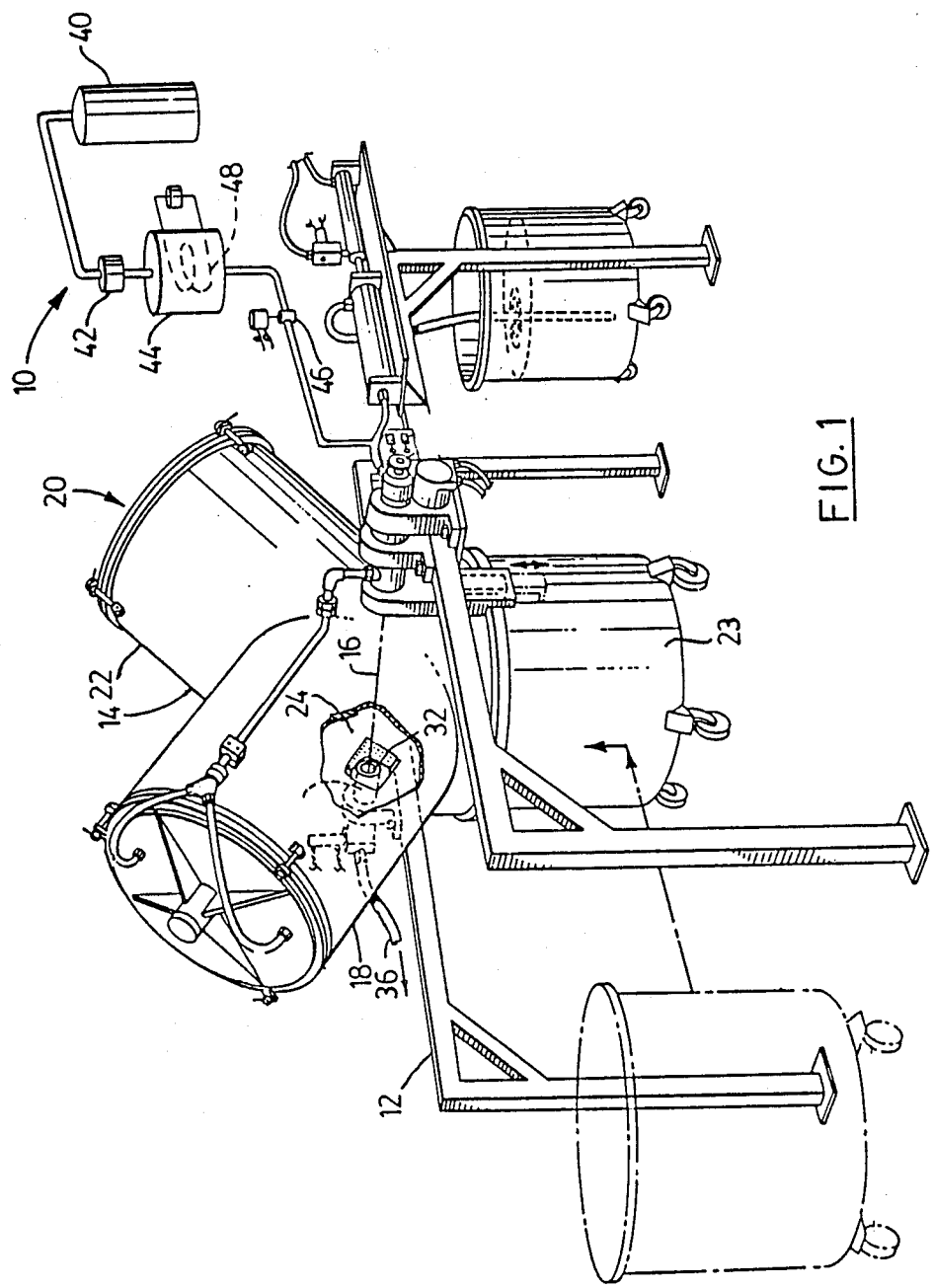

United States Patent [19]

Langen

[11] Patent Number: 4,864,923
[45] Date of Patent: Sep. 12, 1989

[54] APPARATUS FOR COOLING PIECES OF MEAT

[75] Inventor: Jacobus J. Langen, Rexdale, Canada

[73] Assignee: H. J. Langen & Sons Limited, Mississauga, Canada

[21] Appl. No.: 210,937

[22] Filed: Jun. 24, 1988

[51] Int. Cl.$^4$ .......................... B02B 3/12; B02B 23/00
[52] U.S. Cl. ........................................ 99/533; 99/517; 99/535
[58] Field of Search .................. 99/532, 533, 535, 516, 99/517, 483; 17/25, 51; 27/24 R, 24 A; 426/281, 641; 62/268

[56] References Cited

U.S. PATENT DOCUMENTS

| | | | |
|---|---|---|---|
| 1,425,143 | 8/1922 | Scheib | 99/532 |
| 2,617,349 | 11/1952 | Tucker | 99/532 X |
| 4,250,959 | 2/1981 | Spasojevic | 99/483 X |
| 4,291,617 | 9/1981 | Miller et al. | 99/516 X |
| 4,324,107 | 4/1982 | Pipe et al. | 99/517 |
| 4,356,762 | 11/1982 | Langen | 99/533 |

Primary Examiner—Timothy F. Simone
Attorney, Agent, or Firm—Fetherstonhaugh & Co.

[57] ABSTRACT

A method of cooling pieces of meat comprises the step of injecting a cooled gaseous medium into the pieces of meat at a plurality of injection sites. The meat curing machine is provided with a system for injecting a cooled gaseous medium through the injection needles thereof into individual pieces of meat in order to cool the meat pieces.

8 Claims, 2 Drawing Sheets

APPARATUS FOR COOLING PIECES OF MEAT

This invention relates to a method and apparatus for cooling pieces of meat.

In particular, this invention relates to a method and apparatus for cooling meat using the meat injection system commonly used to inject brine into meat for the purposes of injecting a cooled gaseous medium into the meat.

Prior Art

The shelf life of cured meat such as cooked ham is very important to a retailer. Every additional day of shelf life which can be achieved by the processing of a meat product can greatly improve the ability of the retailer to sell all of the product before it deteriorates to an unacceptable level. For this reason, even one more day of shelf life is considered to be extremely desirable by those engaged in the meat processing industry.

Generally, cured meats such as ham are considered to have a shelf life of the order of about 27 days. This can make it difficult to distribute these products over widely dispersed geographical areas without requiring expensive transportation systems such as air freight.

The rate at which meat products deteriorate can be substantially reduced if the meat products are cooled to a temperature of the order of about 40° as quickly as possible because at 40° bacterial growth is minimized.

After slaughter, a carcass is generally at a temperature of about 105° F. The carcass is then hung in a cooler for 24 hours and this will serve to reduce the temperature to about 42°. It is not practical to reduce the temperature below 42° because subsequent to cooling, it is necessary to work the meat in order to skin the carcass and debone the carcass by hand. The work stations at which these manual operations are carried out are generally maintained at a temperature of about 50° F. and as a result, the meat products tend to warm up from about 42° to about 50° and during this warming stage, bacterial activity may increase substantially.

Meat which is to be cured by brine injection or the like is then injected with a pickle solution generally in the form of a brine.

A meat curing machine suitable for injecting brine into meat is described in U.S. Pat. No. 4,356,762, Nov. 2, 1982. In this apparatus, the curing chamber is rotated until the pieces of meat fall onto the bed of needles located therein and then brine is injected into the meat through the needles. The curing chamber is further rotated and the meat products are discharged from the needles to tumble into one of the other compartments. Simultaneously, a vacuum is drawn in the tumbling chamber.

This mechanism is not, however, designed to permit a gaseous medium to be injected into the meat products and the concept of injecting a gaseous medium is not disclosed or suggested therein.

It is an object of the present invention to provide a method of cooling pieces of meat by injecting a cooled gaseous medium into the meat.

It is a further object of the present invention to provide a meat curing apparatus which includes means for injecting a cooled gaseous medium into pieces of meat.

According to one aspect of the present invention, there is provided a method of cooling pieces of meat comprising the steps of injecting a cooled gaseous medium into the pieces of meat at a plurality of injection sites.

According to a further aspect of the present invention, there is provided in a meat curing machine of the type having a plurality of hollow needles through which a meat curing fluid is injected into pieces of meat in use, the improvement of means for injecting a cooled gaseous medium through said injection needles.

According to a further aspect of the present invention, there is provided in a brine injection machine of the type having a bed of needles which is located in a curing chamber which is mounted for rotation so as to tumble pieces of meat into engagement with the needles such that the needles are caused to be embedded in the meat and means for injecting brine through the needles into the meat and means for drawing a partial vacuum in said chamber, the improvement of means for injecting a cooled gaseous medium through said injection needles.

Figure 2:
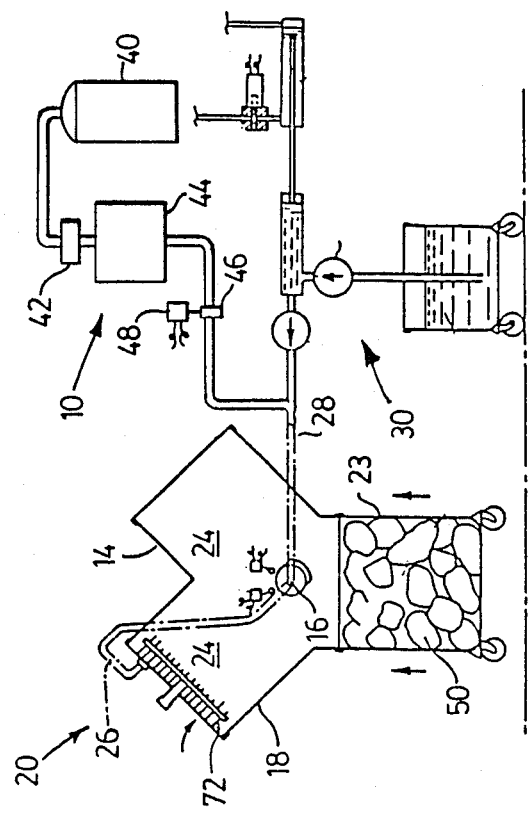

The invention will be more clearly understood after reference to the following detailed specification read in conjunction with the drawings, wherein;

FIG. 1 is a pictorial view of a meat curing machine constructed in accordance with an embodiment of the present invention, FIG. 2 is a diagrammatic side view showing a first step in the meat curing process, With reference to FIGS. 1 and 2 of the drawings, the reference numeral 10 refers generally to the injection system used for the purposes of injecting a cooled gaseous medium into the meat product. The injection system 10 is used in combination with a meat curing machine which is generally identified by the reference numeral 20. This machine is constructed in accordance with U.S. Pat. No. 4,356,762 dated Nov. 2, 1982 and will not therefore be described in detail. The machine 20 includes a frame 12 in which a housing 14 is mounted for rotation about axis 16. The housing 14 consists of first and second tank portions 18 and 22 and a detachable wagon portion 23. A tumbling chamber 24 is located within the housing 14. A plurality of hollow needles 72 are mounted in the end of the tank portion 18 and communicate with the brine injection apparatus which is generally identified by the reference numeral 30 through a conduit system 26 which includes an input conduit 28.

The system for injecting cooled gaseous medium 10 communicates with the conduit 28 and consists of a source 40 of a compressed gaseous medium, a sterilizer 42, a cooling device 44 and a flow control valve 46.

The source 40 may be any conventional source of pressurized gaseous medium such as a compressor or a gas storage tank. The sterilizer 42 may be an ultraviolet sterilizer. The cooling device 44 may be in the form of a heat exchanger which has cooling coils 48.

In use, the individual meat pieces 50 are located in the wagon portion 23 and the wagon is elevated to the position shown in FIG. 2. Thereafter, the housing is rotatably driven about the axis of rotation 16 as previously described in Pat. No. 4,356,762 in order to tumble the meat pieces into the chamber in which the needles 72 are located so that the meat pieces are impaled on the needles.

When the meat is to be cooled rather than injected with brine, the solenoid 48 is activated to open the valve 46 to permit the cooled gaseous medium to pass therethrough. The cooled gaseous medium then passes through the conduit 28 and conduit 26 and needles 72 into the individual meat pieces much in the manner in which the brine is injected. After a predetermined dwell time, the solenoid 48 is then activated to close the valve 46 and the tumble housing is rotated to tumble the meat items into the compartment formed in the housing 14. This tumbling action will serve to expel some of the cooling medium from the interior of the individual meat items and this expelled gaseous medium will be extracted from the housing 18 through the vacuum passage 32 and vacuum conduit 36. This process may be repeated for a predetermined number of injections in order to substantially reduce the temperature of the individual meat products.

The cooled gaseous medium may be air, nitrogen or any other inert gaseous medium which will not contaminate the meat products. The cooled gaseous medium which is injected into the meat is preferably at a temperature of the order of about 30° at the point of discharge from the injection needles 72.

Various modifications of the present invention will be apparent to those skilled in the art.

In one such modification, the mechanism which is used for injecting the brine into the meat may be adapted to act as an injection device for injecting air rather than liquid through the needles 72. In a further modification, the system which is used for injecting a cooled gaseous medium may be used in combination with a different type of needle injector. This system may be used in combination with a conventional needle injector of the type which is used for the purposes of injecting brine into meat products before the meat products are located in a holding tank for curing purposes.

In addition, the use of present method of cooling meat products by injecting a cooled gaseous medium may be used to advantage in other meat processes which do not involve the use of a curing fluid medium but which require meat to be cooled rapidly in order to maintain freshness during meat processing operations.

These and other modifications of the present invention will be apparent to those skilled in the art.

I claim:

1. In a meat curing machine of the type having a plurality of hollow injection needles through which a meat curing fluid is injected into pieces of meat in use, the improvement of;
   means for injecting a cooled gaseous medium through said injection needles, a source of cooled gaseous medium communicating with said means of injecting a gaseous medium, and sterilizing means for sterilizing the gaseous medium prior to injection through said needles.

2. In a brine injection machine of the type having a bed of injection needles which is located in a curing chamber which is mounted for rotation so as to tumble pieces of meat into engagement with the needles such that the needles are embedded in the meat and means for injecting brine through the needles into the meat and means for drawing a partial vacuum in said chamber, the improvement of means for injecting a cooled gaseous medium through said injection needles, and sterilizing means for sterilizing the gaseous medium prior to injection through said needles.

3. A meat curing machine comprising;
   (a) a plurality of hollow injection needles for penetrating a piece of meat,
   (b) injection means for injecting a fluid substance through said needles,
   (c) means for selectively connecting the injection means to a source of cooled gaseous fluid or a source of meat curing liquid.

4. A meat curing machine comprising;
   (a) a plurality of hollow injection needles,
   (b) a source of meat curing fluid,
   (c) a source of cooled gaseous medium,
   (d) means for selectively connecting the injection needles to the source of meat curing fluid or the source of cooled gaseous medium whereby the meat which is to be cured is cooled by the injection of cooled gaseous medium and is cured by the injection of curing fluid, through the same needles.

5. A meat curing machine as claimed in claim 3, further comprising input passage means for supplying said gaseous medium to said injection means and cooling means in said passage means for cooling the gaseous medium as it passes therethrough.

6. A meat curing machine as claimed in claim 3, further comprising sterilizing means in said input passage means for sterilizing the gaseous medium as it passes therethrough.

7. A brine injection machine as claimed in claim 4, further comprising input passage means for supplying said gaseous medium to said injection needles and cooling means in said input passage means for cooling the gaseous medium as t passes therethrough.

8. A brine injection machine as claimed in claim 7, further comprising sterilizing means in said input passage means for sterilizing the gaseous medium as it passes therethrough.

* * * * *